US008594489B2

(12) United States Patent
Chen et al.

(10) Patent No.: US 8,594,489 B2
(45) Date of Patent: Nov. 26, 2013

(54) CD/DVD RECORDER

(75) Inventors: Chi-Hsien Chen, Taipei (TW);
Chia-Jung Ho, Taipei (TW); Yu-Lu Tsai, Taipei (TW); Tsu-Kuang Ho, Taipei (TW); Yau-Te Fang, Taipei (TW); Tse-Cheng Lou, Taipei (TW)

(73) Assignee: Transpacific Electronics, LLC, Wilmington, DE (US)

( * ) Notice: Subject to any disclaimer, the term of this patent is extended or adjusted under 35 U.S.C. 154(b) by 1690 days.

(21) Appl. No.: 11/382,024

(22) Filed: May 6, 2006

(65) Prior Publication Data

US 2006/0263070 A1 Nov. 23, 2006

(30) Foreign Application Priority Data

May 17, 2005 (TW) .............................. 094115847 A

(51) Int. Cl.
*H04N 5/76* (2006.01)
*H04N 9/80* (2006.01)
*H04N 5/92* (2006.01)
*H04N 7/16* (2011.01)
*G06F 3/00* (2006.01)

(52) U.S. Cl.
USPC ........... 386/291; 386/239; 386/248; 386/326; 715/700; 715/705; 715/716; 725/37; 725/38; 725/151

(58) Field of Classification Search
USPC ........... 386/1, 46, 95, 125–126, 83, 291–299, 386/239–248, 326–342
See application file for complete search history.

(56) References Cited

U.S. PATENT DOCUMENTS 6,504,553 B2 * 1/2003 Fado et al. ..................... 715/727
7,356,774 B2 * 4/2008 Shah et al. ..................... 715/771
2001/0018661 A1 * 8/2001 Sato et al. ........................ 705/5
2002/0174430 A1 * 11/2002 Ellis et al. ...................... 725/46
2004/0055006 A1 * 3/2004 Iwamura ......................... 725/37
2004/0131335 A1 * 7/2004 Halgas et al. ................... 386/83
2004/0189827 A1 9/2004 Kim et al.
2005/0102699 A1 * 5/2005 Kim et al. ...................... 725/81

FOREIGN PATENT DOCUMENTS

WO WO 92/22983 * 12/1992

OTHER PUBLICATIONS

VIZIO, Quickstart Guide, M260VP LED LCD HDTV, 2 pages.*
Coby, TFT LCD Widescreen Television, Instruction Manual, 21 pages.*
Users Manual, UW40T Series, Westinghouse Digital, LLC., 68 pages.*
topshareware.com—Internet—http://topshareware.com/Audio-Conversion-Wizard; Mar. 16, 2003.

* cited by examiner

*Primary Examiner* — Hung Dang
(74) *Attorney, Agent, or Firm* — Christensen O'Connor Johnson Kindness PLLC

(57) ABSTRACT

The present invention discloses a CD/DVD recorder with a gradual recording guidance function. The recorder includes at least one video/audio signal sources input end for receiving external video/audio signal sources, a memory for storing a gradual recording guidance program, and a processor for connection to the memory and execution of the program. Execution of the program by the processor includes at least the steps of: displaying on a monitor in single-screen mode a man-machine display screen for selecting recording video/audio sources, and then displaying on the same screen the positions at which the video/audio signal sources input ends are installed in the recorder; and displaying on the monitor in single-screen mode a man-machine display screen for selecting a recording video/audio quality option, and then displaying on the same screen the recording time left with regard to a rewritable/recordable CD/DVD immediately after the recording video/audio quality option is selected.

8 Claims, 13 Drawing Sheets

CD/DVD RECORDER

FIELD OF THE INVENTION

The present invention relates to a CD/DVD recorder, and more particularly, to a CD/DVD recorder with a gradual recording guidance function whereby screens displayed in single-screen mode give a user step-by-step guidance on how to input recording parameters.

BACKGROUND OF THE INVENTION

Owing to the complicated design of a recording screen of a conventional CD/DVD recorder, a user has to use the same screen for inputting various parameters, such as video/audio signal sources, recording quality, television broadcast channel, recording start and stop time, and date of timer recording. The same screen is used for inputting so many recording parameters that, not only does the user have little idea how to input the parameters, but the user may omit some parameters.

In light of the shortcomings of the recording man-machine interface of a conventional CD/DVD recorder, the inventor of the present invention studied hard and devised an improved CD/DVD recorder having a gradual recording guidance function whereby man-machine display screens displayed in single-screen mode give step-by-step guidance to a user on how to input recording parameters.

SUMMARY OF THE INVENTION

It is a primary objective of the present invention to provide a CD/DVD recorder having a gradual recording guidance function whereby step-by-step guidance is given to a user on how to input recording parameters.

To achieve the above and other objective, the present invention provides a CD/DVD recorder having a gradual recording guidance function. The CD/DVD recorder includes at least one video/audio signal sources input end, one memory, and one processor. The video/audio signal sources input ends receive external video/audio signal sources. The memory stores a gradual recording guidance program. Connected to the memory, the processor executes the gradual recording guidance program. Execution of the gradual recording guidance program by the processor includes at least the steps of: displaying on a monitor in single-screen mode a man-machine display screen for selecting recording video/audio sources; displaying on the same screen the positions at which the video/audio signal sources input ends are installed in the CD/DVD recorder; displaying on the monitor in single-screen mode a man-machine display screen for selecting a recording video/audio quality option; and displaying on the same screen the recording time left with regard to a rewritable/recordable CD/DVD immediately after the recording video/audio quality option is selected.

For a further understanding of the nature and advance of the present invention, reference should be made to the following description in conjunction with the accompanying drawings.

BRIEF DESCRIPTION OF THE DRAWINGS

The objective and other objectives and advantages of the present invention will become more apparent upon reading of the following detailed description and the accompanying drawings in which.

DETAILED DESCRIPTION OF THE INVENTION

Figure 1:
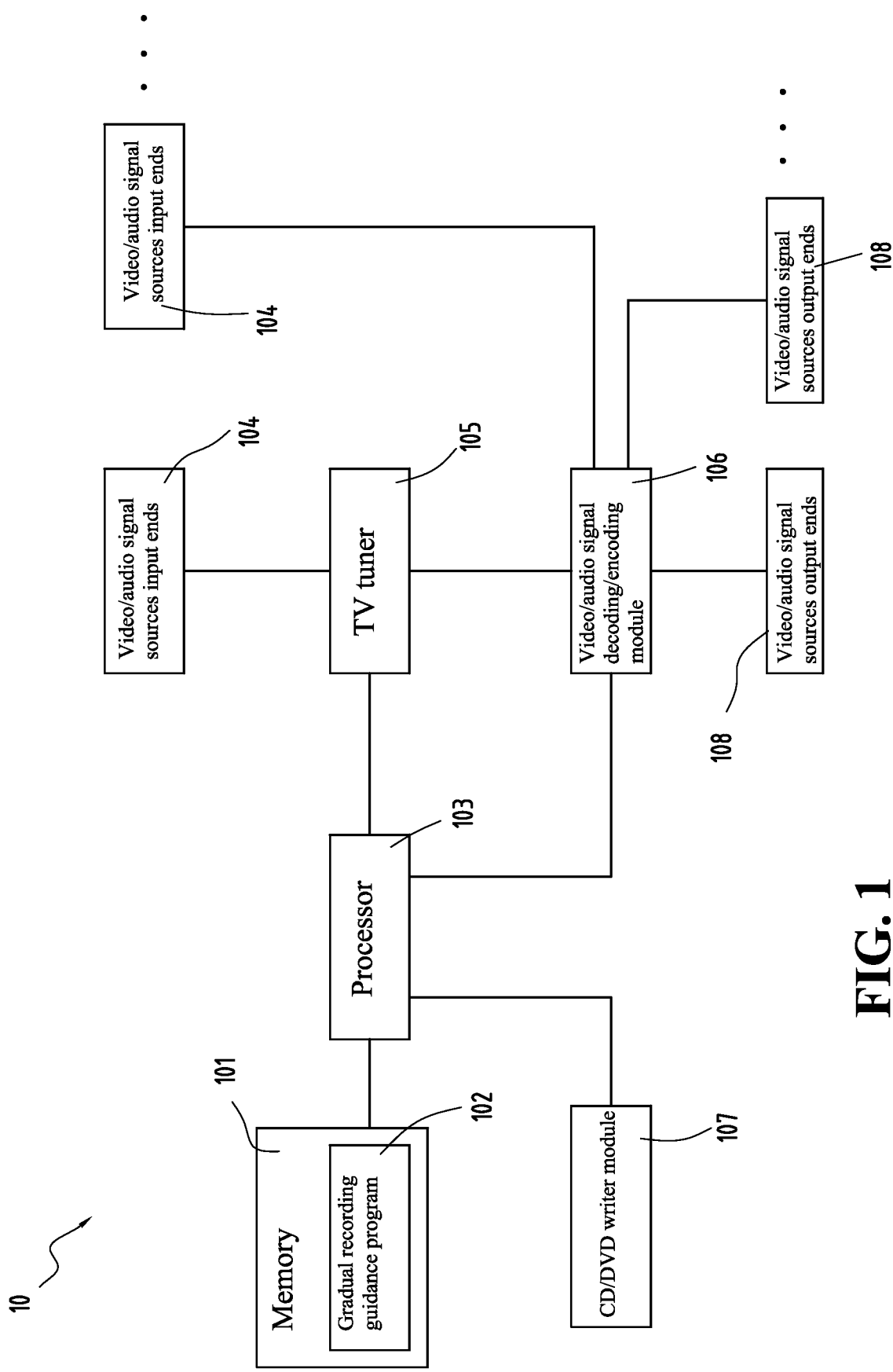
FIG. 1 shows a block diagram of a CD/DVD recorder of the present invention.

FIG. 1 shows a block diagram of a CD/DVD recorder of the present invention. The present invention provides a CD/DVD recorder 10 with a gradual recording guidance function whereby man-machine display screens displayed in single-screen mode give step-by-step guidance to a user on how to perform recording, such that the user can store an intended program on a rewritable/recordable CD/DVD with ease. The CD/DVD recorder 10 comprises a memory 101, a gradual recording guidance program 102, a processor 103, at least one video/audio signal sources input end 104, a TV tuner 105, a video/audio signal decoding/encoding module 106, a CD/DVD writer module 107, and at least one video/audio signal output end 108, as described below.

A specific means to implementation of the video/audio signal sources input ends 104 comprises, for example, a video terminal, an audio terminal, a S-terminal, a VGA terminal, a DVI terminal, a component terminal, and a SCART terminal. The terminals are configured to receive external video/audio signal sources. The user selects one of the external video/audio signal sources, using buttons of a remote control (not shown) of the CD/DVD recorder 10.

More specifically, a specific means to implementation of the video/audio signal sources input ends 104 is an antenna terminal which connects the TV tuner 105 to an antenna (or a cable TV wire). The user selects the channel of a TV program to be recorded, using a TV channel button of the remote control.

The video/audio signal decoding/encoding module 106 links up the video/audio signal sources input ends 104, the TV tuner 105, and the video/audio signal output ends 108. The module 106 is not only equipped with an analog-to-digital converter but also configured to decompress any compressed video/audio signals so as to achieve restoration of images and sounds. By contrast, the module 106 compresses any video/audio signals which have not yet been compressed; for instance, it compresses a TV program to allow the TV program to have a DVD-compatible video format.

The CD/DVD writer module 107 is capable of reading data stored on a rewritable/recordable CD/DVD and recording the data on the CD/DVD. The data recorded are video/audio signals compressed by the module 106.

The memory 101 stores the gradual recording guidance program 102 and other programs. The processor 103 executes all the programs stored in the memory 101 and controls the operation of the CD/DVD recorder 10.

Figure 2:
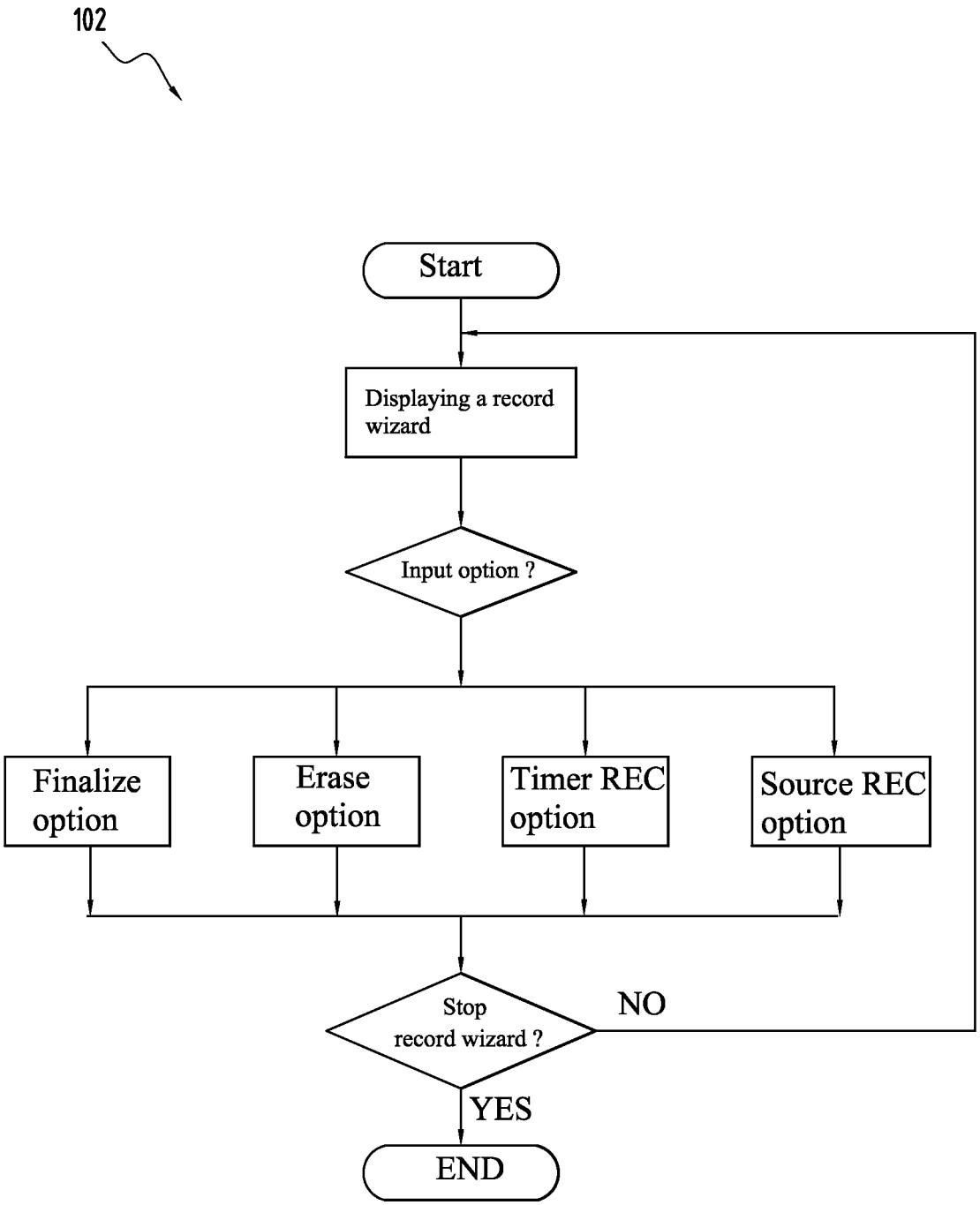
FIG. 2 shows a flow chart of execution of a gradual recording guidance program by a CD/DVD recorder of the present invention.
Figure 3:
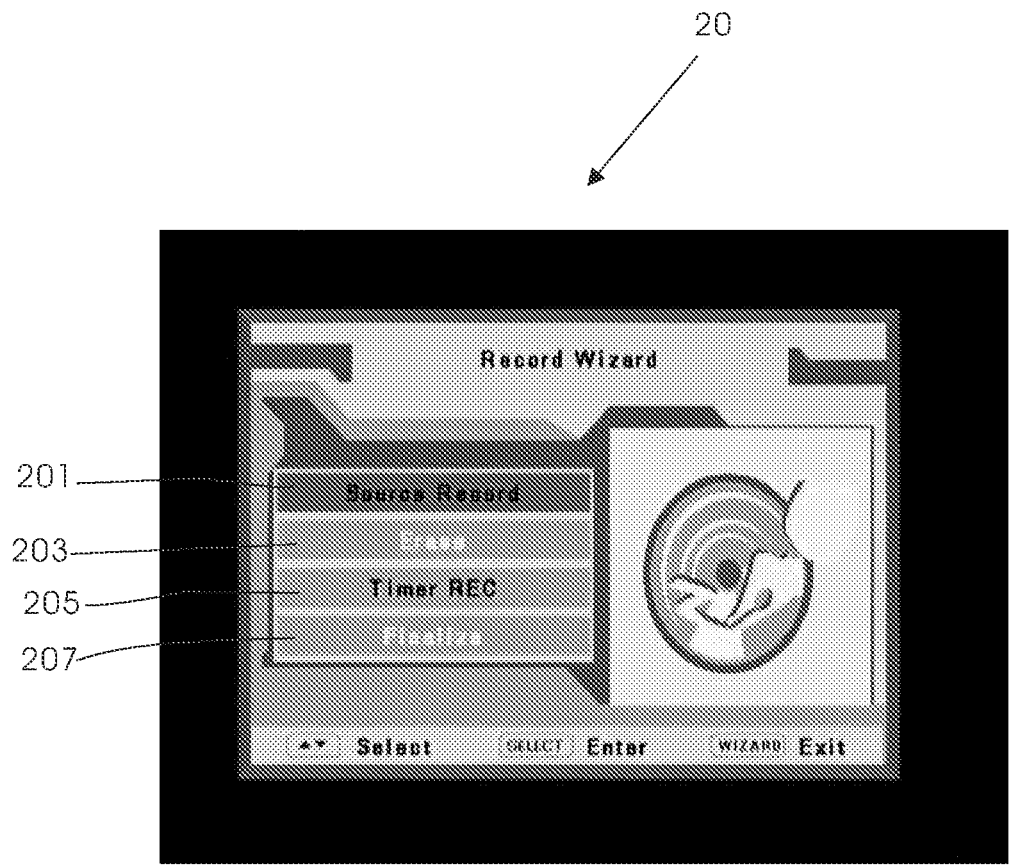
FIG. 3 shows a man-machine display screen displayed in single-screen mode and configured to display a record wizard in accordance with the present invention.

FIG. 2 shows a flow chart of execution of the gradual recording guidance program 102 by the CD/DVD recorder 10 of the present invention. Once the user presses a recording button of the remote control, the processor 103 executes the gradual recording guidance program 102 right away and enables a man-machine display screen for displaying a record wizard 20 to appear, wherein the man-machine display screen for displaying the record wizard 20 is displayed on a monitor (not shown) in single-screen mode. Referring to FIG. 3, options displayed on the man-machine display screen for displaying the record wizard 20 comprise a source recording option 201, an Erase option 203, a Timer REC option 205, and a Finalize option 207.

Figure 4:
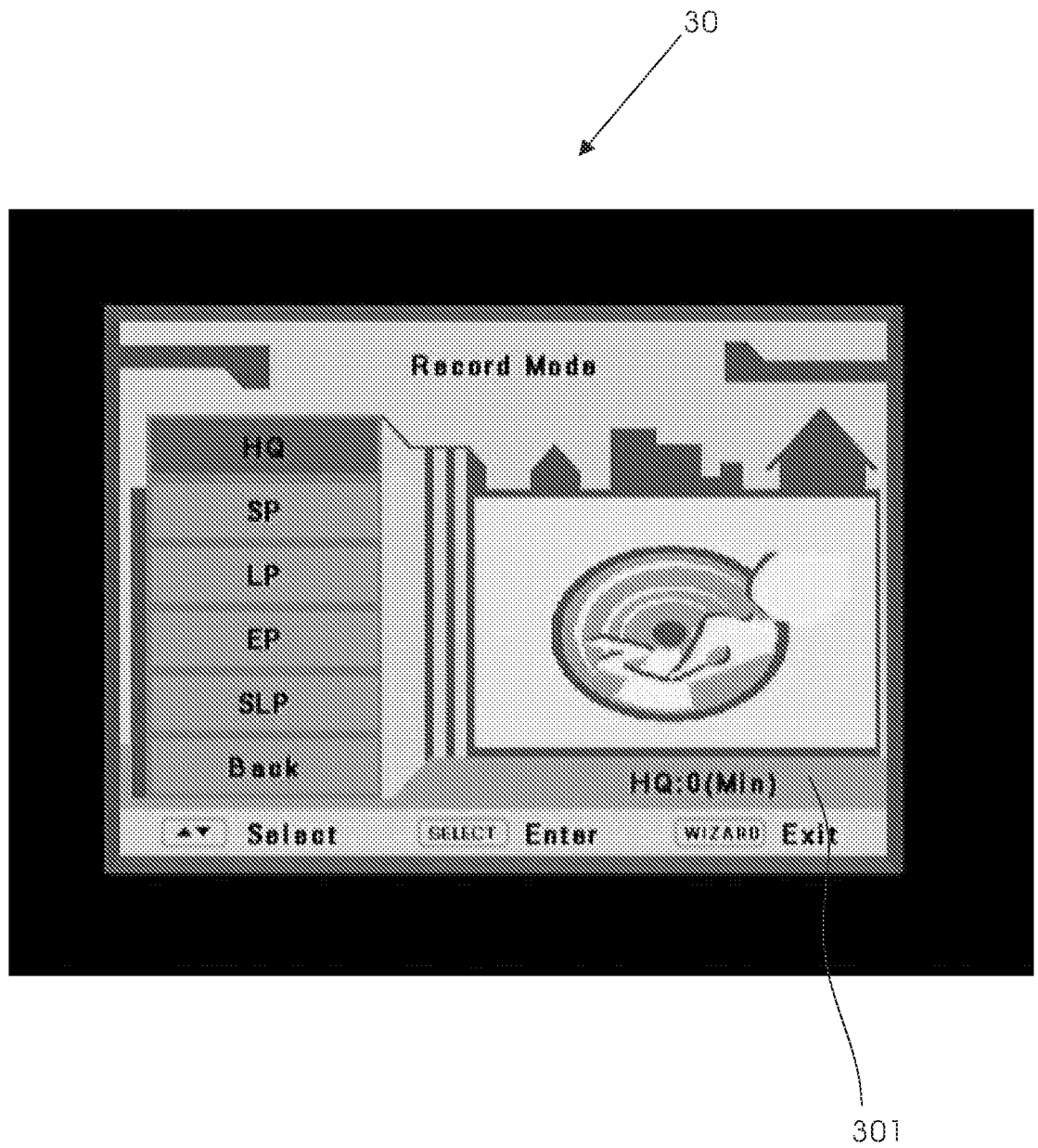
FIG. 4 shows a man-machine display screen displayed in single-screen mode and configured to display recording video/audio quality options in accordance with the present invention.

In the course of execution of a source recording function or a timer recording function of the gradual recording guidance program 102 by the processor 103, the processor 103 enables a man-machine display screen 30 to appear, and the man-machine display screen 30 appears on the monitor in single-screen mode. The screen 30 displays recording video/audio quality options which comprise recording quality modes, such as HQ mode, SP mode, LP mode, EP mode, and SLP mode, for controlling picture quality. The user chooses an intended recording video/audio quality option, using the remote control. Referring to FIG. 4, upon selection of the recording video/audio quality option, the screen 30 displays a recording time left 301 so as to show the current unused recording capacity of the rewritable/recordable CD/DVD.

Figure 5:
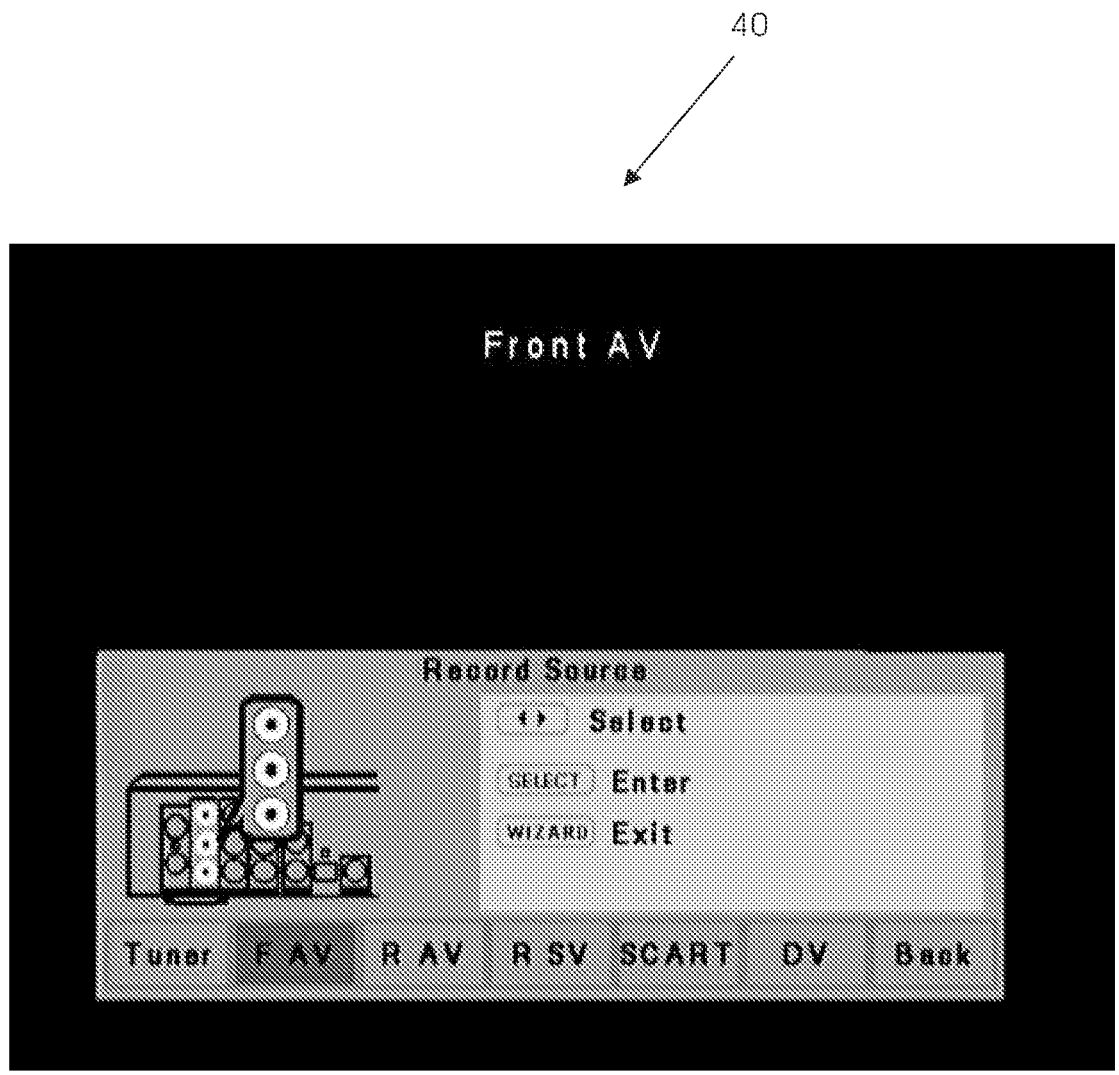
FIG. 5 shows a man-machine display screen displayed in single-screen mode and configured to display recording video/audio signal sources options in accordance with the present invention.

In the course of execution of a source recording function or a timer recording function of the gradual recording guidance program 102 by the processor 103, the processor 103 enables a man-machine display screen 40 to appear, and the man-machine display screen 40 appears on the monitor in single-screen mode. Referring to FIG. 5, the screen 40 displays video/audio signal sources options, such as the TV tuner 105, a front-end AV terminal, a back-end AV terminal, a back-end S-terminal, and a DV terminal. In addition, the screen 40 shows where the terminals are on the CD/DVD recorder 10. The user selects an intended video/audio signal source, using the remote control.

Figure 6:
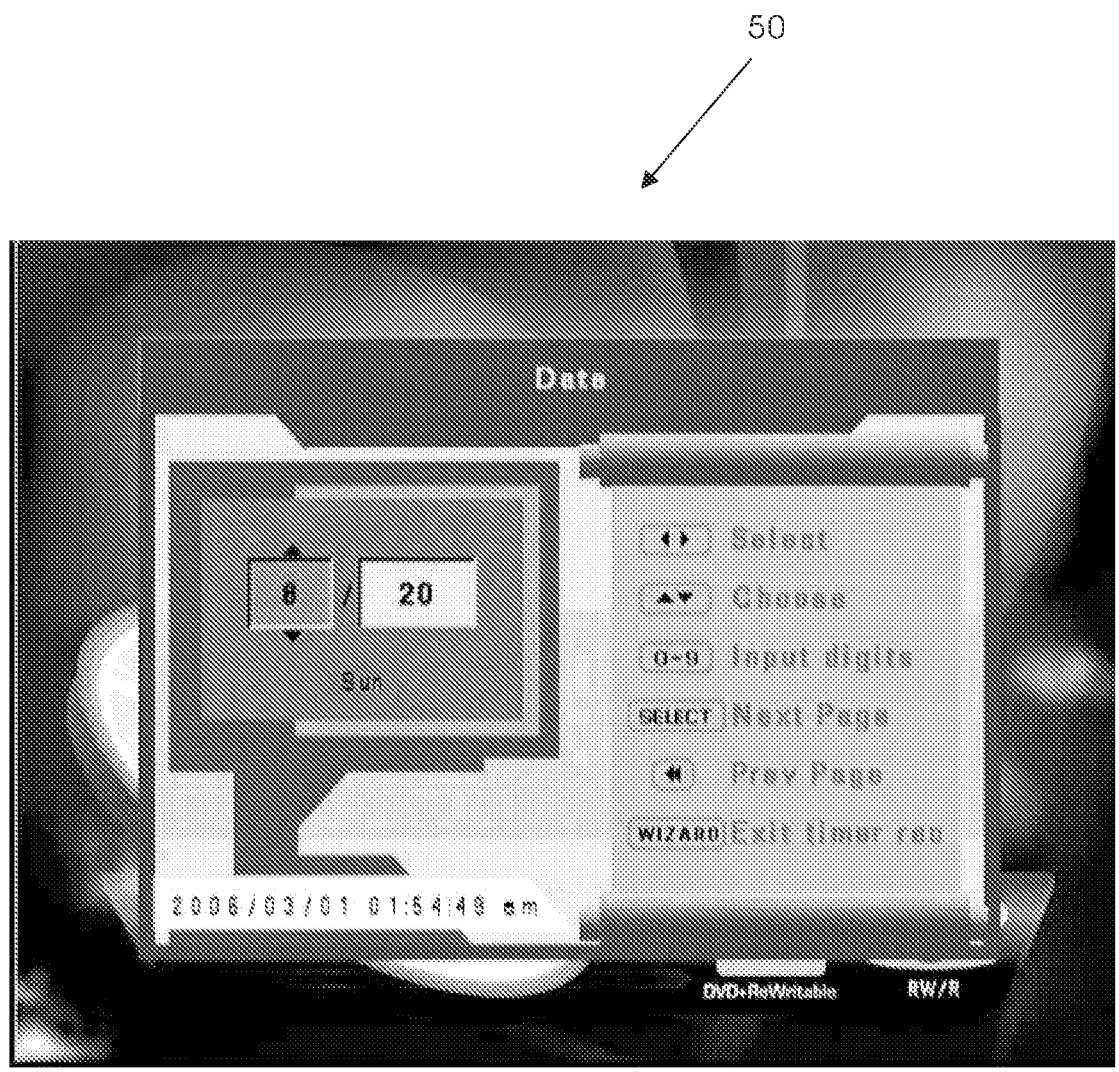
FIG. 6 shows a man-machine display screen displayed in single-screen mode and configured to provide user guidance on inputting a date of timer recording in accordance with the present invention.
Figure 7:
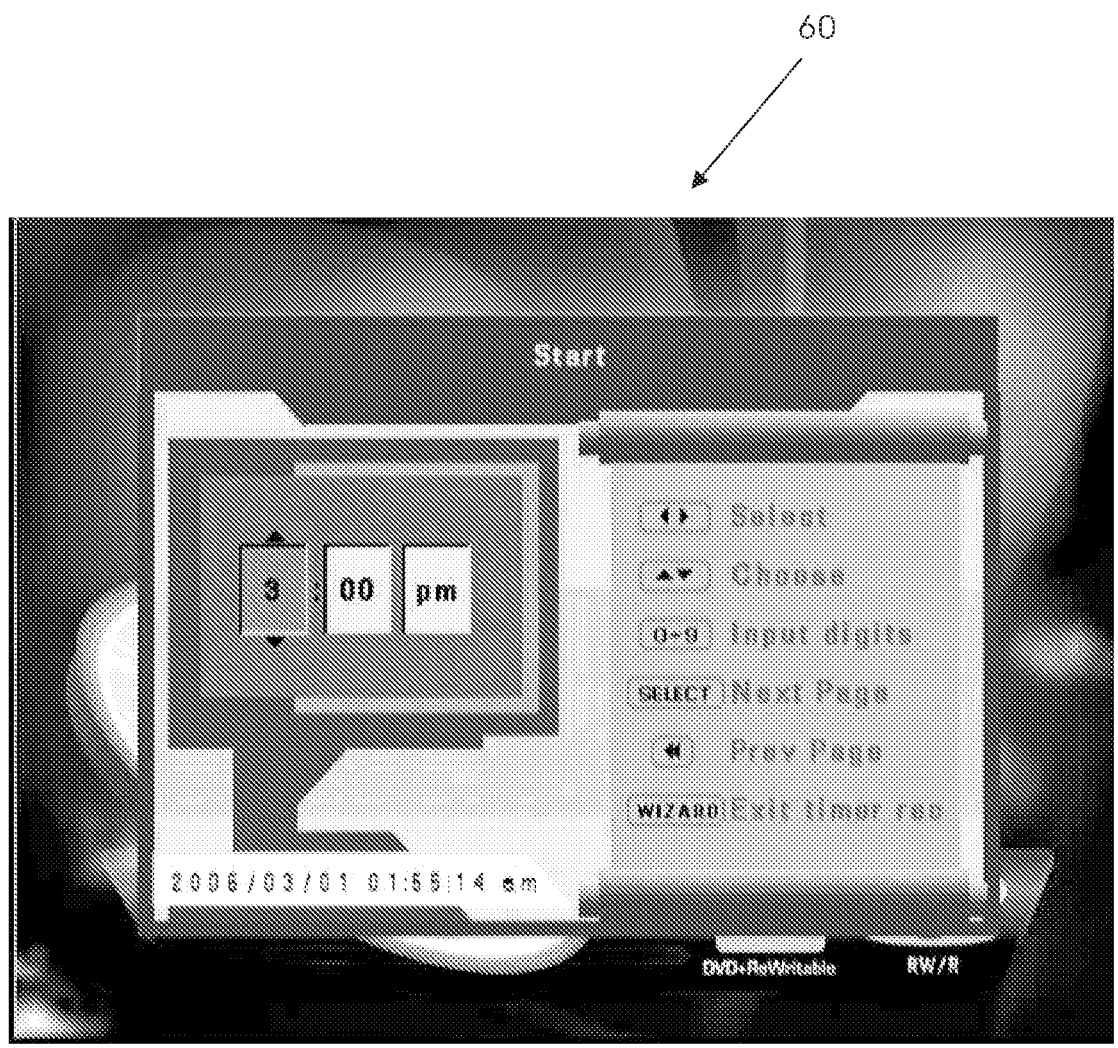
FIG. 7 shows a man-machine display screen displayed in single-screen mode and configured to provide user guidance on inputting a recording start time in accordance with the present invention.
Figure 8:
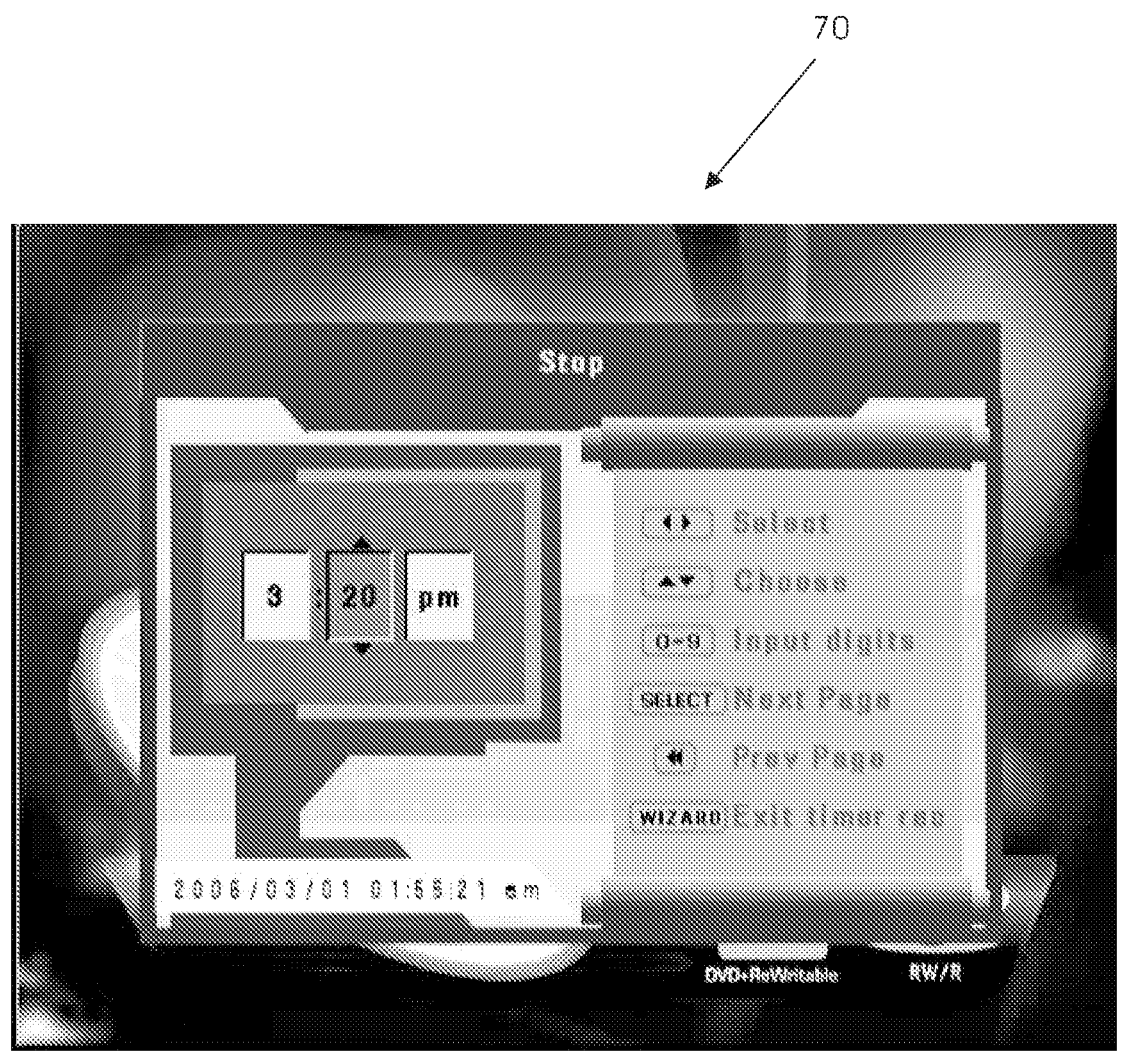
FIG. 8 shows a man-machine display screen displayed in single-screen mode and configured to provide user guidance on inputting a recording stop time in accordance with the present invention.

In the course of execution of a source recording function or a timer recording function of the gradual recording guidance program 102 by the processor 103, the processor 103 enables man-machine display screens 50, 60 and 70 to appear, as shown in FIGS. 6, 7 and 8; and the screens 50, 60 and 70 appear on the monitor in single-screen mode. The screen 50 gives guidance to the user on how to input a date of timer recording. The screen 60 gives guidance to the user on how to input a recording start time. The screen 70 gives guidance to the user on how to input a recording stop time.

Figure 9:
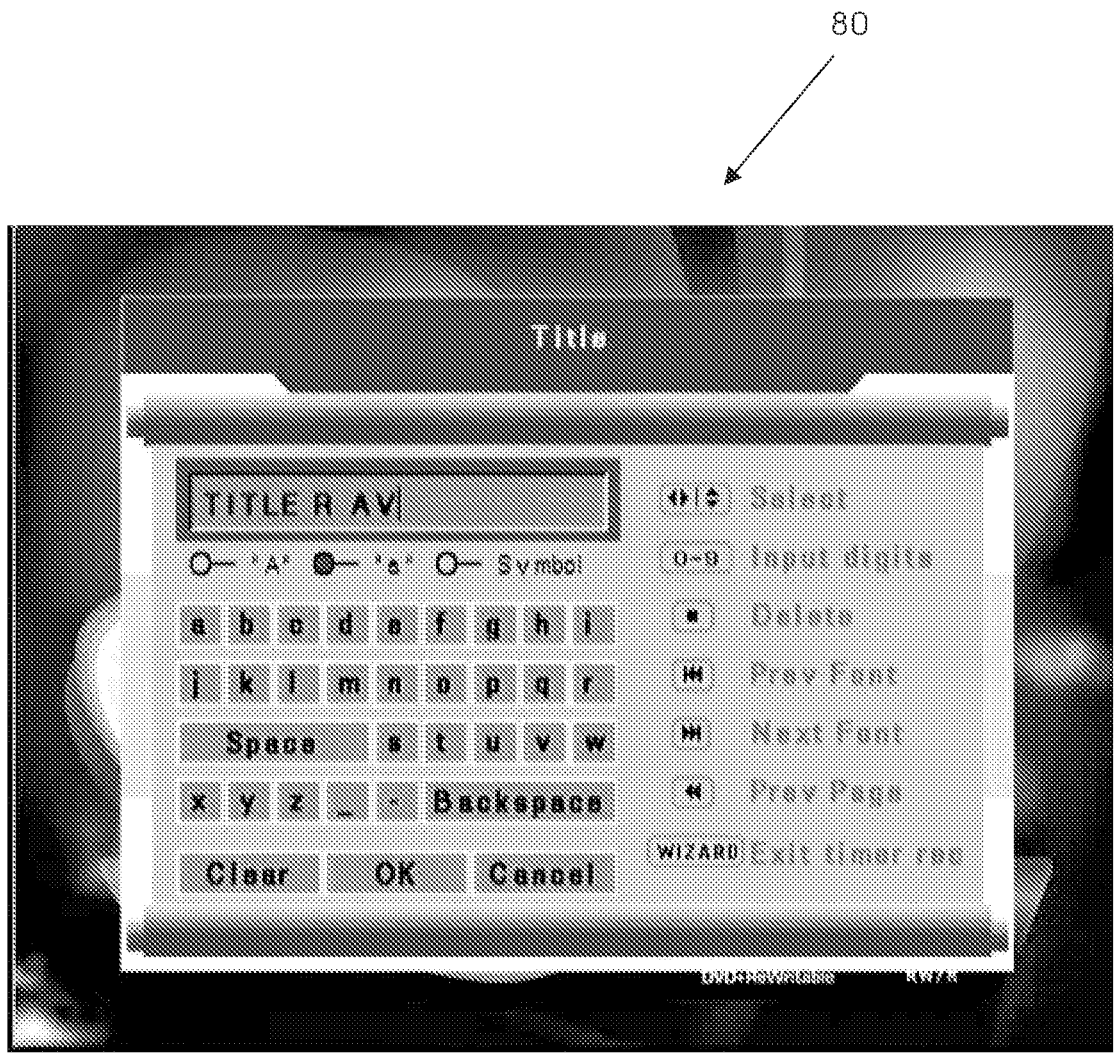
FIG. 9 shows a man-machine display screen displayed in single-screen mode and configured to provide user guidance on inputting a tag name of a rewritable/recordable CD/DVD in accordance with the present invention.

In the course of execution of a source recording function or a timer recording function of the gradual recording guidance program 102 by the processor 103, the processor 103 enables a man-machine display screen 80 to appear, and the man-machine display screen 80 appears on the monitor in single-screen mode. Referring to FIG. 9, the screen 80 gives guidance to the user on how to input a tag name of a rewritable/recordable CD/DVD.

Figure 10:
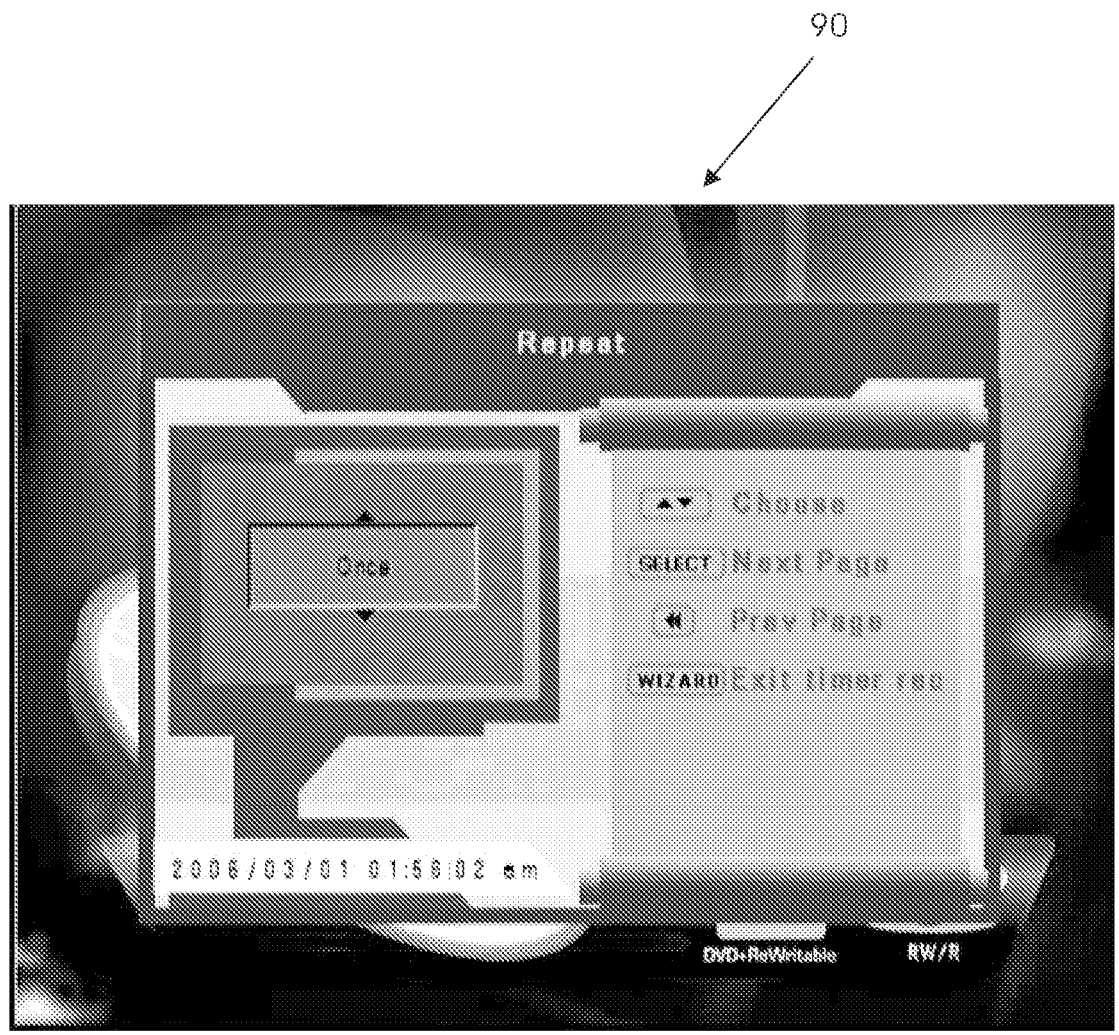
FIG. 10 shows a man-machine display screen displayed in single-screen mode and configured to display recording repeat options in accordance with the present invention.

In the course of execution of a timer recording function of the gradual recording guidance program 102 by the processor 103, the processor 103 enables a man-machine display screen 90 to appear, and the screen 90 appears on the monitor in single-screen mode. Referring to FIG. 10, the screen 90 displays recording repeat options, for example, once, at the same time every day, at the same time on the same day every day, and at the same time on the same day from Monday to Friday. The user selects an intended repeat option, using the remote control.

Figure 11:
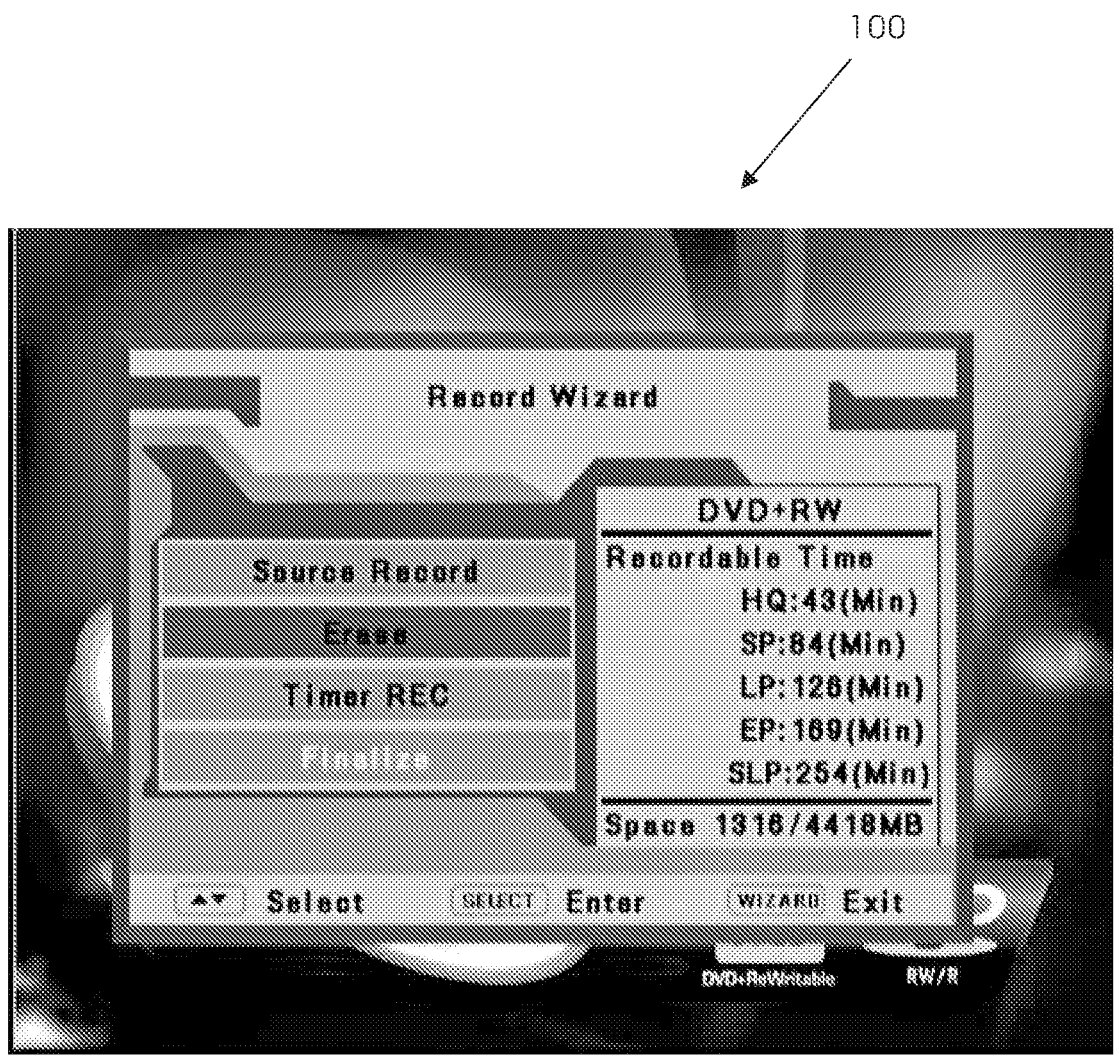
FIG. 11 shows a man-machine display screen displayed in single-screen mode allowing a user to initiate an erase function in accordance with the present invention.

In the course of execution of an Erase function of the gradual recording guidance program 102 by the processor 103, the processor 103 enables a man-machine display screen 100 to appear, and the man-machine display screen 100 appears on the monitor in single-screen mode. Referring to FIG. 11, the screen 100 displays the current unused recording capacity of the rewritable/recordable CD/DVD so as to allow the user to choose between erasure and recording.

Figure 12:
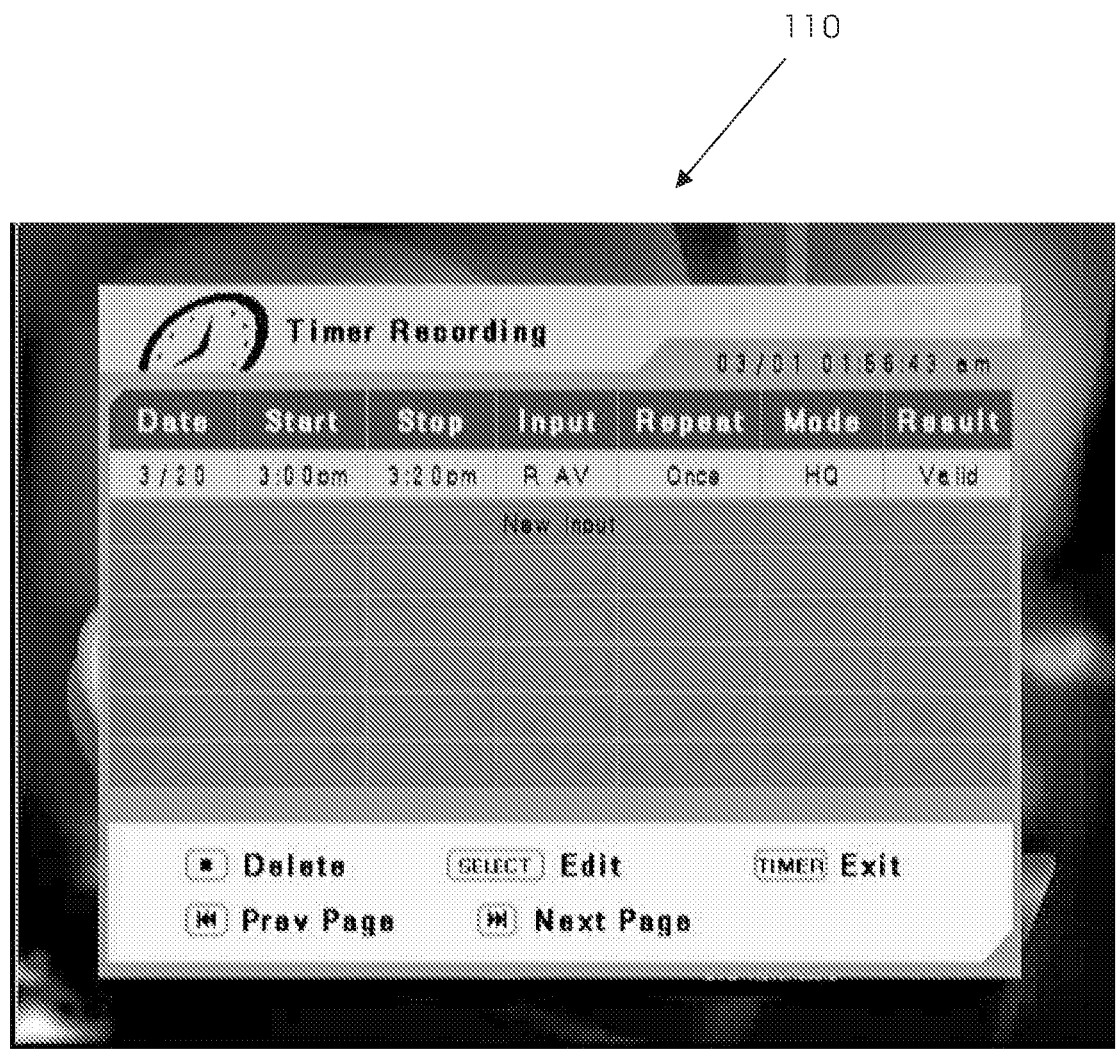
FIG. 12 shows a man-machine display screen displayed in single-screen mode allowing a user to initiate a finalize function in accordance with the present invention.

In the course of execution of a Finalize function of the gradual recording guidance program 102 by the processor 103, the processor 103 enables a man-machine display screen 110 to appear, and the screen 110 appears on the monitor in single-screen mode, as shown in FIG. 12.

Figure 13:
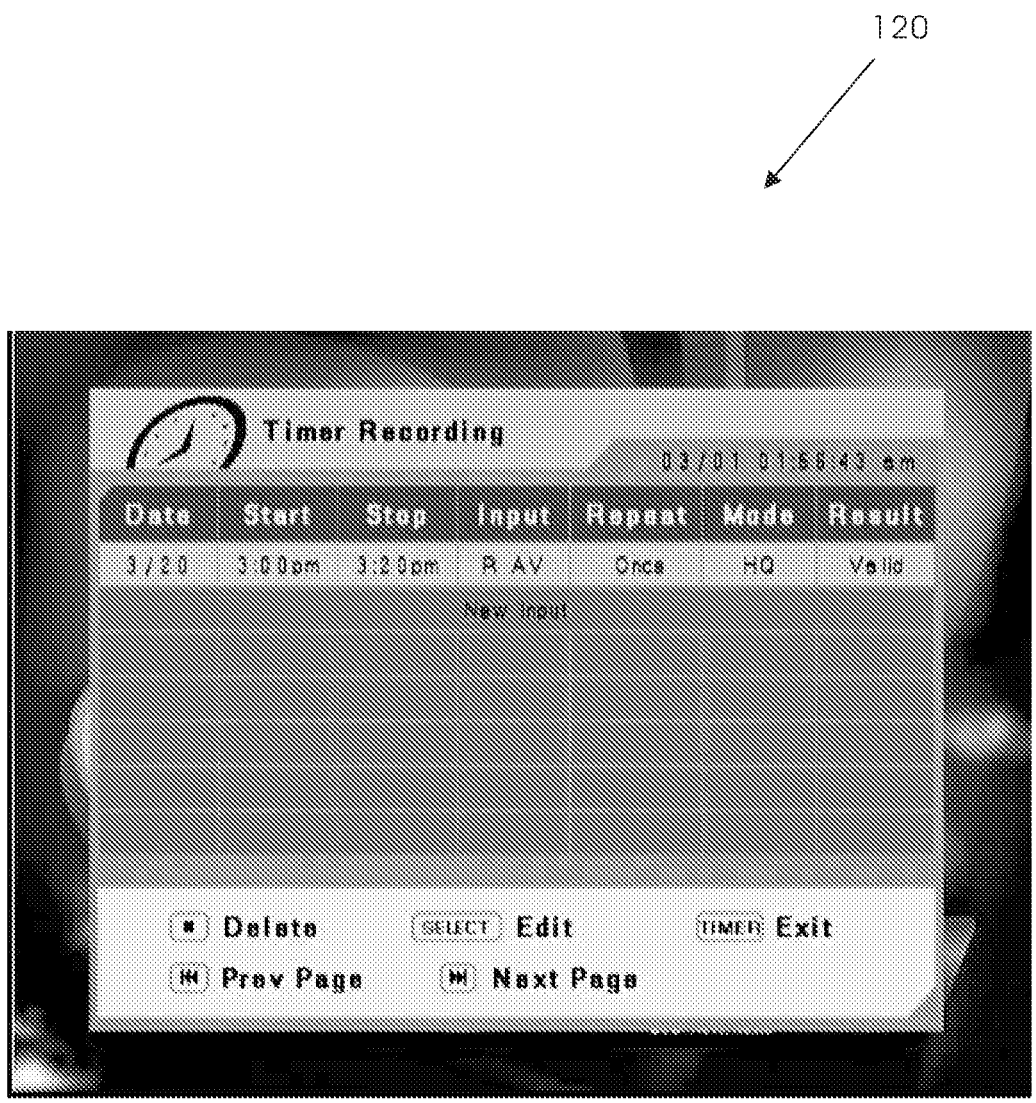
FIG. 13 shows a man-machine display screen displayed in single-screen mode and configured to display a timer recording checklist in accordance with the present invention.

Referring to FIG. 13, a man-machine display screen 120 displays a timer recording checklist. The screen 120 appears on the monitor in single-screen mode such that the user gains insight into all timer recording states at a glance.

The CD/DVD recorder of the present invention functions by man-machine display screens displayed in single-screen mode, so as to provide a gradual recording guidance function, allowing a user to learn recording with ease. With each screen being solely configured to perform a single type of setting operation, the operation screen is always simple. Obviously, the present invention has an advantage, that is, ease of use.

While the present invention has been described by way of examples and in terms of a preferred embodiment, it is to be understood that the present invention is not limited thereto. It should be understood that the detailed description and specific examples, while indicating preferred embodiments of the present invention, are given by way of illustration only, since various changes and modifications within the spirit and scope of the present invention will become apparent to those skilled in the art from this detailed description. Therefore the scope of the appended claims should be accorded the broadest interpretation so as to encompass all such changes and modifications.

What is claimed is:

1. A method of recording a program using a recorder for use with a display device, wherein the recorder comprises a plurality of input terminals that are each couplable to a different signal source, the method comprising:

receiving a command to record the program on a rewritable/recordable recording medium;

in response to receiving the command, displaying a first of a plurality of screens on the display device, wherein the first of the plurality of screens displays only a first selectable recording setting operation;

receiving a selection associated with the first selectable recording setting operation;

in response to receiving the selection associated with the first selectable recording setting operation, displaying a second of the plurality of screens on the display device, wherein the second of the plurality of screens displays only a second selectable recording setting operation that is different than the first selectable recording setting operation;

receiving a selection associated with the second selectable recording setting operation; and recording the program on the rewritable/recordable recording medium based on the received selections after displaying a last of the plurality of screens on the display device and receiving a selection associated with a selectable recording setting operation displayed on the last of the plurality of screens, wherein at least one selectable recording setting operation displayed on one of the plurality of screens is comprises a graphical representation of a physical layout of the location of each of the plurality of input terminals on the recorder and configured to allow a user to select a signal source based on the graphical representation, wherein the graphical representation further displays an enlarged view of a selected terminal.

2. The method of claim 1, further comprising after receiving the command to record the program on the rewritable/recordable recording medium and before displaying the first of the plurality of screens on the display device:

displaying a wizard screen comprising a plurality of selectable options; and receiving an indication that one of the plurality of options has been selected, wherein the first of the plurality of screens is displayed on the display device in response to receiving the indication that one of the plurality of options has been selected.

3. The method of claim 1, wherein the first one of the plurality of screens is configured to specify a record quality, the second one of the plurality of screens is configured to specify a signal source, a third one of the plurality of screens is configured to specify a record date, a fourth one of the plurality of screens is configured to specify a record start time, and a fifth one of the plurality of screens is configured to specify a record stop time.

4. The method of claim 3, wherein a sixth one of the plurality of screens is configured to specify a tag name for the rewritable/recordable recording medium.

5. The method of claim 3, wherein the first one of the plurality of screens displays an amount of record time remaining on the rewritable/recordable recording medium.

6. The method of claim 1, wherein the recorder comprises a CD/DVD recorder and the rewritable/recordable recording medium comprises a CD or a DVD.

7. A recorder for use with a display device, the recorder comprising a remote control, a writer module, a plurality of input terminals that are each couplable to a different signal source, and a processor configured to:

sequentially display a plurality of screens, one at a time, on the display device, each of the plurality of screens being configured to display only a single selectable recording setting operation;

receive a command to record a program on a rewritable/recordable recording medium from the remote control;

in response to receiving the command from the remote control, display a first of the plurality of screens on the display device, wherein the first of the plurality of screens displays only a first selectable recording setting operation;

receive a selection associated with the first selectable recording setting operation;

in response to receiving the selection associated with the first selectable recording setting operation, display a second of the plurality of screens on the display device, wherein the second of the plurality of screens displays only a second selectable recording setting operation that is different than the first selectable recording setting operation;

receive a selection associated with the second selectable recording setting operation;

after displaying a last screen in the series of screens on the display device, instruct the writer module to record the program on the rewritable/recordable recording medium based on the received selections after displaying a last of the plurality of screens on the display device and receiving a selection associated with a selectable recording setting operation displayed on the last of the plurality of screens, wherein at least one selectable recording setting operation displayed on one of the plurality of screens comprises a graphical representation of a physical layout of the location of each of the plurality of input terminals on the recorder and is configured to allow a user to select a signal source based on the graphical representation wherein the graphical representation further displays an enlarged view of a selected terminal.

8. The recorder of claim 7, wherein the recorder comprises a CD/DVD recorder and the rewritable/recordable recording medium comprises a CD or a DVD.

* * * * *

UNITED STATES PATENT AND TRADEMARK OFFICE
CERTIFICATE OF CORRECTION

| | | |
|---|---|---|
| PATENT NO. | : 8,594,489 B2 | Page 1 of 1 |
| APPLICATION NO. | : 11/382024 | |
| DATED | : November 26, 2013 | |
| INVENTOR(S) | : Chen et al. | |

It is certified that error appears in the above-identified patent and that said Letters Patent is hereby corrected as shown below:

In the Claims:

In Column 6, Line 32, in Claim 7, delete "operation;" and insert -- operation; and --, therefor.

Signed and Sealed this
Sixth Day of May, 2014

Michelle K. Lee
*Deputy Director of the United States Patent and Trademark Office*